Patented June 30, 1936

2,045,628

UNITED STATES PATENT OFFICE 2,045,628

REFINING CELLULOSE ACETATE

Johannes Alfthan, New York, N. Y., assignor to Du Pont Viscoloid Company, Wilmington, Del., a corporation of Delaware No Drawing. Application November 3, 1934, Serial No. 751,282

5 Claims. (Cl. 260—102)

This invention relates to improvements in refining cellulose acetate and, more particularly, relates to a process of refining cellulose acetate of the type used in the plastics art, i. e., cellulose acetate having an acetyl number between 50–54.

Cellulose acetate as prepared by any of the commercial processes is used as the raw material for the manufacture of films, filaments, sheeting, and a wide variety of other products. The cellulose acetate in the forms available for such manufactures is rarely, if ever, free from foreign material of one sort or another, the presence of which impairs the quality of the goods made from the cellulose acetate, particularly if such goods are of transparent character. In addition to dirt of various sorts such as particles of wood, metal, sand, straw, et cetera, which are the result of contamination in the manufacture and handling of the cellulose acetate, there are present in commercial cellulose acetate also particles of unreacted or improperly reacted cellulose and possibly of other materials which, when the cellulose acetate is made up into a transparent plastic, make themselves evident in the form of "dust", "hairs", stardust", and the like, i. e., particles which are individually and plainly visible in the transparent plastic, particularly under oblique illumination and which impair the appearance and suitability of the plastic for such uses as for the interlayer of safety glass. The present invention relates to an improved method of removing such particles from cellulose acetate.

Where the products to be manufactured involve the formation of the cellulose acetate in the form of solutions, the removal of foreign matter such as described above, by filtration or other clarification means, is relatively simple. However, in the manufacture, from cellulose acetate, of materials of the type known as "plastics", i. e., sheeting, rods, tubes, etc., capable of being machined, pressed, swedged, molded, or the like, and also molding compounds in various forms capable of being welded and shaped by the application of heat and pressure, the ordinary methods of manufacture from cellulose acetate flake do not involve the formation of a solution and hence do not provide an opportunity for thorough removal of the objectionable foreign material.

For example, in the ordinary manufacture of plastics from cellulose acetate, a dough is made up by mixing the cellulose acetate with suitable organic solvents and, ordinarily, substances of the type known as plasticizers. This dough is then forced through a filtering medium in order to remove dirt, but the consistency of the dough is such that it is not practical to use for this purpose a filtering medium fine enough to remove the smaller visible particles or contaminating substances and, consequently, the finished plastic made from this filtered dough, such as sheeting made for use in safety glass, still contains an objectionable amount of the contaminating substances. On the other hand, where a dope or solution is made for lacquers, and the like, a filtering medium fine enough to remove these small particles is quite feasible.

To effect a more thorough removal of these fine particles would require a finer filtering medium and this is not practical unless the dough be reduced to a liquid state of low enough viscosity to permit its being forced at a commercially economical rate through the finer filtering media. To accomplish this would require the use of a very much higher proportion of solvent than ordinarily used in plastic processes, and the resulting solution could not be used directly in the ordinary process of manufacturing sheeting or other plastics which involves the steps of rolling, baking, sheeting, and seasoning. Such a solution obviously could not be worked by methods usual in the plastic art, for example, on the rolls.

To use such a solution in the usual plastic processes it has heretofore been considered necessary either to concentrate it by evaporation of a large percentage of the solution to reduce it to the form of a workable dough, or to precipitate the cellulose acetate from the solution by the addition of a non-solvent. Both of these methods involve so much expense, both for the cost of manipulating and solvent losses, that neither one has been adopted in a commercial process of refining cellulose acetate.

It can be seen, therefore, that over a long period there has been an urgent need for a process of refining or clarifying cellulose acetate, and particularly for one adaptable to the special requirements of the plastic processes, which will be capable of effecting economically a clarification as nearly perfect as that which is so readily and cheaply accomplished in the manufacture of cellulose acetate lacquers, films, and the like, and will leave the cellulose acetate in a desirable physical state and not necessitate the need of handling large proportions of solvent in the plastic processes employed for working up the cellulose acetate.

An object of the present invention is to provide an improved and economical process of refining cellulose acetate. A further object is to provide a process of preparing clarified cellulose acetate in forms convenient for handling in the plastic processes, including the well known commercial form of dry "flake." A still further object is to provide a process of refining cellulose acetate of the type used in plastics which will not involve the use of costly solvents nor the loss of large amounts of solvents.

The above objects are accomplished according to the present invention by forming a solution of cellulose acetate having an acetyl number between 50–54, the type of acetate used in plastics, in a mixture of ethyl alcohol and water, by heating the mixture, clarifying the solution while hot, chilling the clarified solution to precipitate the cellulose acetate, and separating the precipitated cellulose acetate from the solvent liquor. The expression "cellulose acetate having an acetyl number between 50–54" is used throughout the specification and claims to denote a cellulose acetate of 50–54% acetyl value, calculated as acetic acid.

More specifically, the invention is carried out by employing an ethyl alcohol-water mixture in which the water content is between 25% and 55%, and preferably does not exceed 45%. To dissolve the cellulose acetate of the type herein considered the mixture must be heated to at least 55° C. and the process is expedited by heating to approximately the boiling point of the mixture. Temperatures in excess of the boiling point of the mixture naturally are to be avoided for economical reasons, unless means to prevent loss of solvent are readily available. The clarification, i. e., removal of the fine contaminating bodies, is preferably effected by filtering in a filter press but may be done by any other suitable means, such as by centrifugation or sedimentation. It has been found that a 9–18% solution of the cellulose acetate in the solvent mixture is most practical, in that a percentage in excess of 18% is apt to form too viscous a dope or solution, whereas a concentration of less than 9% is not economical. To precipitate the cellulose acetate in the clarified solution, the solution must be cooled down to room temperature or slightly above, e. g., 35° C., and to obtain the cellulose acetate in the optimum granular form, the solution should be constantly agitated during the precipitation.

It has been found that an ethyl alcohol-water mixture is peculiarly adapted for carrying out the present process, in that cellulose acetate of the plastics type can be dissolved in this mixture at elevated temperatures, the solution then being filtered to remove the contaminating bodies, and then upon chilling the solution or allowing it to cool down, the cellulose acetate will precipitate out in discontinuous form, e. g., a pulverulent or granular form and is readily separable from the solvent liquor. The agitation of the solution while it is cooling down is highly advantageous in obtaining the precipitate in the most desirable physical state.

The percentages given above and throughout the specification and claims are all by weight and not by volume.

In order to illustrate the invention, the following specific examples are given:—

Example 1.—A mixture of ethyl alcohol (92.4% strength), 118 pounds, and distilled water, 42 pounds, is heated in a steam jacketed aluminum kettle to a temperature just below the point at which boiling begins, or about 79° C. 20 pounds of cellulose acetate having an acetyl number of 52 are now introduced with constant stirring until substantially complete solution takes place. This solution, or dope, is now pumped under pressure through a plate filter press clothed with a filtering medium comprising in succession felt, filter paper, and a 60-mesh metal screen, which last named serves as a support for the felt and paper. During the filtration, suitable measures are taken to hold the temperature of the solution at, or near, its initial temperature both in order to maintain the viscosity of the solution as low as possible so as to facilitate the filtration, and also in order to prevent premature precipitation.

The filter press discharges into a vessel, preferably jacketed, in which the solution is cooled with agitation. If agitation is omitted, the dope as it cools has a strong tendency to ultimately solidify to a cheese-like mass but, by stirring the solution as it cools, the cellulose acetate is caused to precipitate in a granular form which is readily separated from the solvent liquor. Precipitation begins at a temperature of about 45° C. and is substantially complete at about ordinary room temperature, or slightly higher.

The precipitated refined cellulose acetate is now separated from the mother liquor by wringing in a centrifuge, the basket of which is lined with a retaining medium sufficiently fine to prevent the loss of the fine granular solid. The mother liquor is preferably re-used for the dissolving of a subsequent batch of cellulose acetate and, for that purpose, requires merely the addition of a small proportion of strong alcohol to restore any loss of alcohol which may have occurred through evaporation and to compensate for any dilution of the liquid by moisture present in the cellulose acetate as initially dissolved. The refined cellulose acetate may be used in the condition in which it is discharged from the wringer, i. e., retaining some of the mother liquor, or it may be dried before use.

Example 2.—A solution of cellulose acetate having an acetyl number of 52.2 is made up as in Example 1 but using:

| | Pounds |
|---|---|
| Cellulose acetate | 20 |
| Ethyl alcohol (92.4% strength) | 102 |
| Distilled water | 63 |

This solution is subjected, while still hot, to the clarifying action of a rotary clarifier. The centrifugal action of the clarifier effects a separation of the solid contaminating particles. The clarified solution is then treated in the same manner as the filtered dope of Example 1.

The above examples are merely illustrative and it is to be understood that the proportion of ethyl alcohol and water in the solvent mixture may be widely varied, as well as the temperatures of solution and precipitation. Also the clarification means may be modified, as will occur to those skilled in the art.

In selecting the optimum composition of the cellulose acetate solution, several factors must be considered. For clarification by filtration, the solution must, at the temperature of filtration, be of sufficiently low viscosity to be filtered through the selected medium at an economical rate, and thus the percentage of cellulose acetate put into the dope will be governed by the viscosity characteristic of the acetate itself, the nature of the solvent mixture used, the temperature of operation, the character of the filtering medium, and the pressure available for forcing the solution through the filtering medium. Another factor governing the proportion of cellulose acetate put into the solution will be the amount and character of contaminating material which is to be removed; when the amount is high or when the character is such that a difficultly penetrable mat may be formed upon the filter, it may be desirable to reduce the viscosity of the solution in order to obviate too frequent renewal or cleaning of the filter medium. Experience has shown that for cellulose acetates of the plastics type, a concentration of 9-18% cellulose acetate in the hot solution is desirable.

The essential requirements for the solvent mixture for use in the present process are that it shall dissolve the cellulose acetate completely, or nearly so, when hot; that when cooled with agitation, it will deposit the cellulose acetate from solution in proper form, i. e., the precipitated cellulose acetate must not be in a continuous colloidal mass but must be in discontinuous form, e. g., pulverulent or granular, readily separable from the mother liquor by clarification means and without a tendency to adhere together or to coalesce after separation from the mother liquor and without more than slight tendency to syneresis, or "sweating" after separation. Such syneresis not only makes a subsequent second separation necessary but also is an indication of the holding, by the precipitate, of an excessive amount of mother liquor, and thus constitutes a wasteful use of solvent.

It has been found that the solvent most perfectly fulfilling the above requirements and at the same time being relatively cheap, is a mixture of water and ethyl alcohol, which latter may be denatured with any substance which is not objectionable if traces of it remain in the clarified product, such as methyl alcohol, benzol, and the like. The properties of the ethyl alcohol-water mixtures are so well adapted for the present purpose and so economical that these particular mixtures are, from practical considerations, uniquely adapted for the present purposes.

The ratio of water to alcohol in the ethyl alcohol-water mixtures may be varied within wide ranges but it has been found that, in order to cause the cellulose acetate to be precipitated in the desired granular form, the water content should not exceed 45-55%. On the other hand, the percentage of water may be reduced to as low as 25% but mixtures containing less than this amount of water will, ordinarily, not be satisfactory since, upon cooling, the solution will gel instead of a precipitate forming as is desired.

As previously mentioned, the most convenient concentration of cellulose acetate in the solution will be between 9% and 18%, the former representing approximately the limit below which the amount of cellulose acetate clarified, per batch, is too much reduced for economical production, and the higher figure representing approximately the limit beyond which, with cellulose acetate of ordinary viscosity characteristics, the viscosity of the dope becomes too high for an efficient and economically rapid clarification.

The following cellulose acetate solution compositions are given to illustrate suitable formulae for use in the present invention:—

|  | Ex. A | Ex. B | Ex. C | Ex. D |
|---|---|---|---|---|
| Cellulose acetate, plastics type, pounds. | 100 | 100 | 100 | 100 |
| Ethyl alcohol (92.4% by weight), pounds. | 457 | 508 | 593 | 484 |
| Distilled water, pounds | 375 | 311 | 208 | 180 |
| Strength of alcohol-water mixture, by weight, percent. | 51 | 57.3 | 68.5 | 67.4 |

The process of the present invention is, of course, applicable to the refining of cellulose acetate of the plastics type, that is, cellulose acetate having an acetyl number between 50-54, for all purposes but its advantages are most prominent in the refining of cellulose acetate for the manufacture of interlayer sheets for safety glass and other cellulose acetate plastics where clarity is at a premium.

The present invention provides a new and improved means for the thorough and economical refinement of cellulose acetate and makes possible the use of filtering media of great fineness, and of other effective means of clarification, which accomplish a correspondingly thorough removal of contaminating particles, without resort to the use of solvent in large proportions or to solvents of high cost. In contradistinction to methods heretofore proposed, this process is economical in the use of solvent, both from the standpoint that no excessive quantity of solvent is required and from the standpoint that there is no substantial dilution of the solvent so that the recovered solvent may be directly re-used in the process without the requirement of any distillation or rectification and with not more than a slight fortification to make up for the small evaporation losses and the small dilution of the solvent by moisture contained in the original cellulose acetate.

A further advantage of the present invention lies in the fact that the physical condition of the refined precipitated cellulose acetate is subject to control in accordance with the original makeup of the solution to be clarified, the rate of cooling, and the conditions of agitation during cooling, so that the refined cellulose acetate is readily produced in a definitely granular form, of reasonably uniform particle size, is readily separated from the mother liquor without loss, and is thereafter in suitable form for use in the ordinary plastics processes.

As many apparently widely different embodiments of this invention may be made without departing from the spirit and scope thereof, it is to be understood that the invention is not limited to the specific embodiments thereof except as defined in the appended claims.

I claim:

1. Process of refining cellulose acetate having an acetyl number between 50—54, comprising forming a solution of the cellulose acetate in a mixture of ethyl alcohol and water in which mixture the water content is between 25% and 55%, by heating the mixture, clarifying the solution while hot, chilling the clarified solution to precipitate the cellulose acetate, and separating the cellulose acetate from the solvent liquor.

2. Process of refining cellulose acetate having an acetyl number between 50-54, comprising forming a 9-18% solution of the cellulose acetate in a mixture of ethyl alcohol and water in which mixture the water content is between 25% and 55%, by heating the mixture, clarifying the solution while hot, chilling the clarified solution to precipitate the cellulose acetate, and separating the precipitated cellulose acetate from the solvent liquor.

3. Process of refining cellulose acetate having an acetyl number between 50-54, comprising forming a 9-18% solution of the cellulose acetate in a mixture of ethyl alcohol and water in which mixture the water content is between 25% and 55%, by heating the mixture to at least 55° C., clarifying the solution while hot, chilling the clarified solution with agitation to below 35° C. to precipitate the cellulose acetate in granular form, and separating the precipitated cellulose acetate from the solvent liquor.

4. Process of refining cellulose acetate having an acetyl number between 50–54, comprising forming a 9–18% solution of the cellulose acetate in a mixture of ethyl alcohol and water in which mixture the water content is between 25–55%, by heating the mixture to a temperature of approximately the boiling point thereof but not exceeding said boiling point, clarifying the solution while hot, chilling the clarified solution to approximately room temperature with agitation to precipitate the cellulose acetate in granular form, and separating the precipitated cellulose acetate from the solvent liquor.

5. Process of refining cellulose acetate having an acetyl number between 50–54, comprising forming a 9–18% solution of the cellulose acetate in a mixture of ethyl alcohol and water in which mixture the water content is about 40%, by heating the mixture to a temperature of approximately the boiling point thereof but not exceeding said boiling point, filtering the solution while hot, chilling the filtered solution to approximately room temperature with agitation to precipitate the cellulose acetate in granular form, and separating the precipitated cellulose acetate from the solvent liquor.

JOHANNES ALFTHAN.